United States Patent [19]

Quon

[11] 4,013,324
[45] Mar. 22, 1977

[54] FAULT DETECTION FOR WHEEL SLIP CONTROL SYSTEM

[75] Inventor: Donald S. Quon, St. Louis, Mo.

[73] Assignee: Wagner Electric Corporation, Parsippany, N.J.

[22] Filed: Oct. 6, 1975

[21] Appl. No.: 620,206

[52] U.S. Cl. .................................. 303/92; 303/96; 303/106

[51] Int. Cl.² ...................... B60T 8/00; B60T 8/02; B60T 8/08; B60T 8/10

[58] Field of Search ...... 303/21 AF, 21 EB, 21 BE, 303/21 P, 92, 96, 106

[56] References Cited
UNITED STATES PATENTS

| | | | |
|---|---|---|---|
| 3,599,014 | 8/1971 | Carp | 303/21 EB |
| 3,790,227 | 2/1974 | Dozier | 303/21 AF |
| 3,832,013 | 8/1974 | Davis | 303/21 P |
| 3,883,183 | 5/1975 | Burckhardt | 303/21 P |
| 3,883,184 | 5/1975 | Jonner | 303/21 AF |
| 3,887,046 | 6/1975 | Bueler | 188/181 A |

Primary Examiner—Trygve M. Blix
Assistant Examiner—Reinhard J. Eisenzopf
Attorney, Agent, or Firm—Eyre, Mann, Lucas & Just

[57] ABSTRACT

A fault detection system containing three modes of system shutdown, temporary, latching, or permanent disables an automotive wheel slip control system upon detecting faults in the speed sensors, control valves or interconnecting cables. Temporary shutdown is performed immediately following turn on and whenever certain supply voltages drop below threshold levels. Temporary shutdown is automatically terminated at the end of a predetermined time after turn on or when the supply voltages return to normal. Latching, resettable shutdown is performed in response to excessive apparent speed difference between a pair of wheels where the apparent difference endures too long. Latching shutdown is also performed in response to excessive actuation time of one or the other of two wheel slip control system solenoid valves and in response to actuation of a second solenoid valve in the absence of cycling of the first solenoid valve. Reset after latching shutdown is performed by removing and reapplying power to the fault detection system. Permanent shutdown is accomplished when cyclic sensor faults cause spurious operation and when solenoid energization is not terminated by inhibit signals generated during latching shutdown. Reset after permanent shutdown is accomplished by replacement of an external power supply fuse which is blown by the operation of the permanent shutdown function. All fault actuations provide energization signals of an external warning indicator and inhibition of external circuits.

24 Claims, 4 Drawing Figures

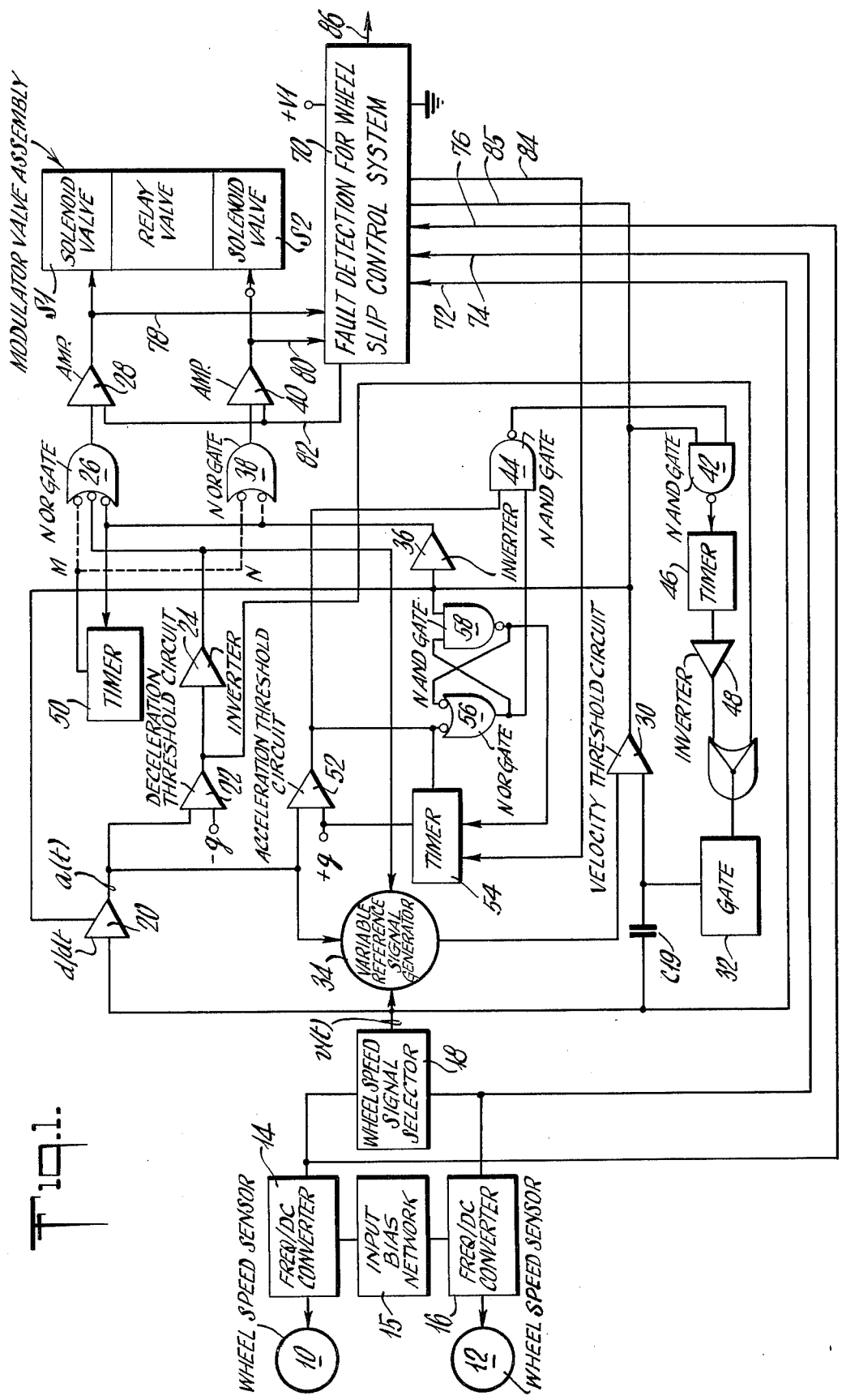

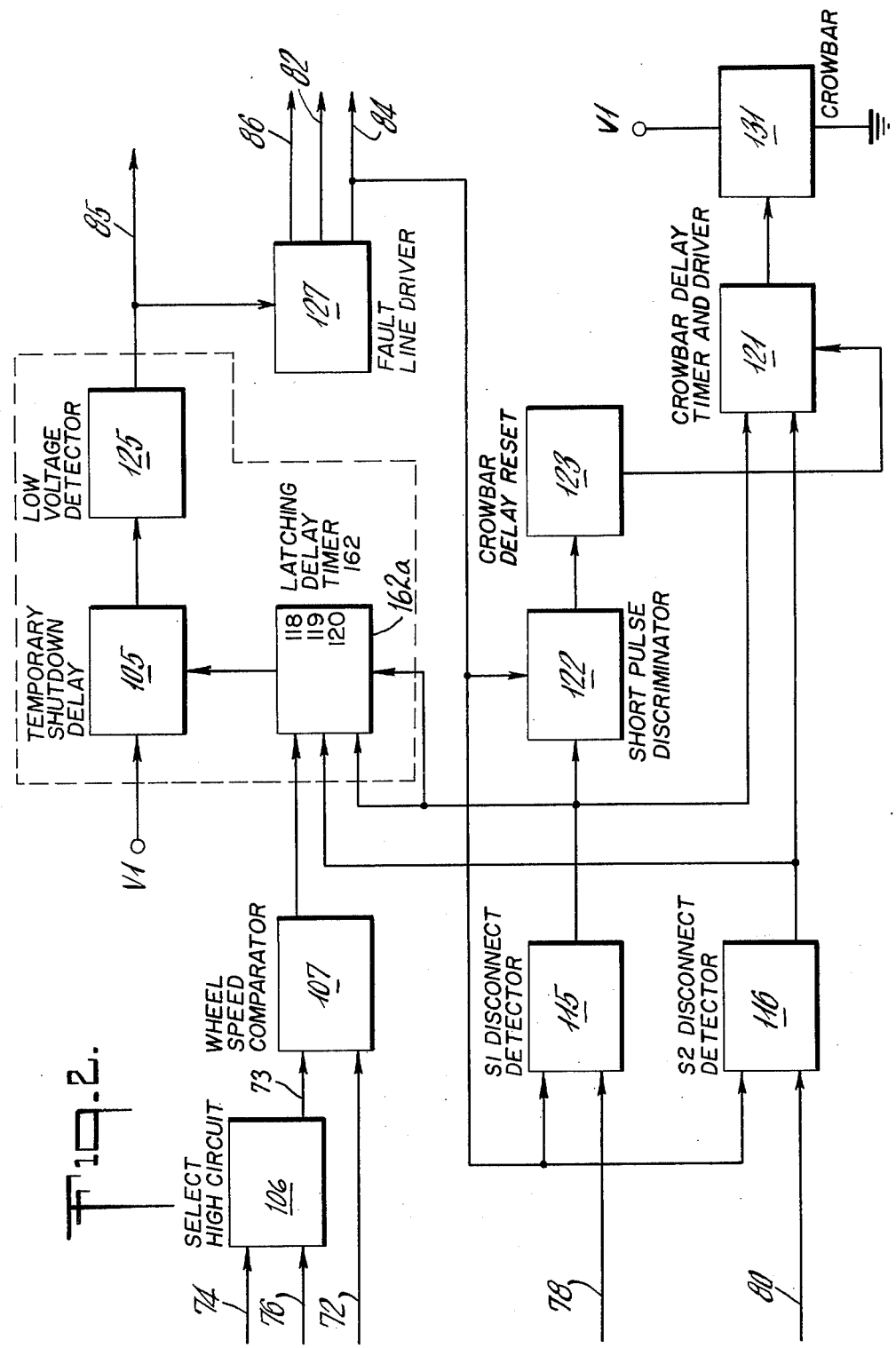

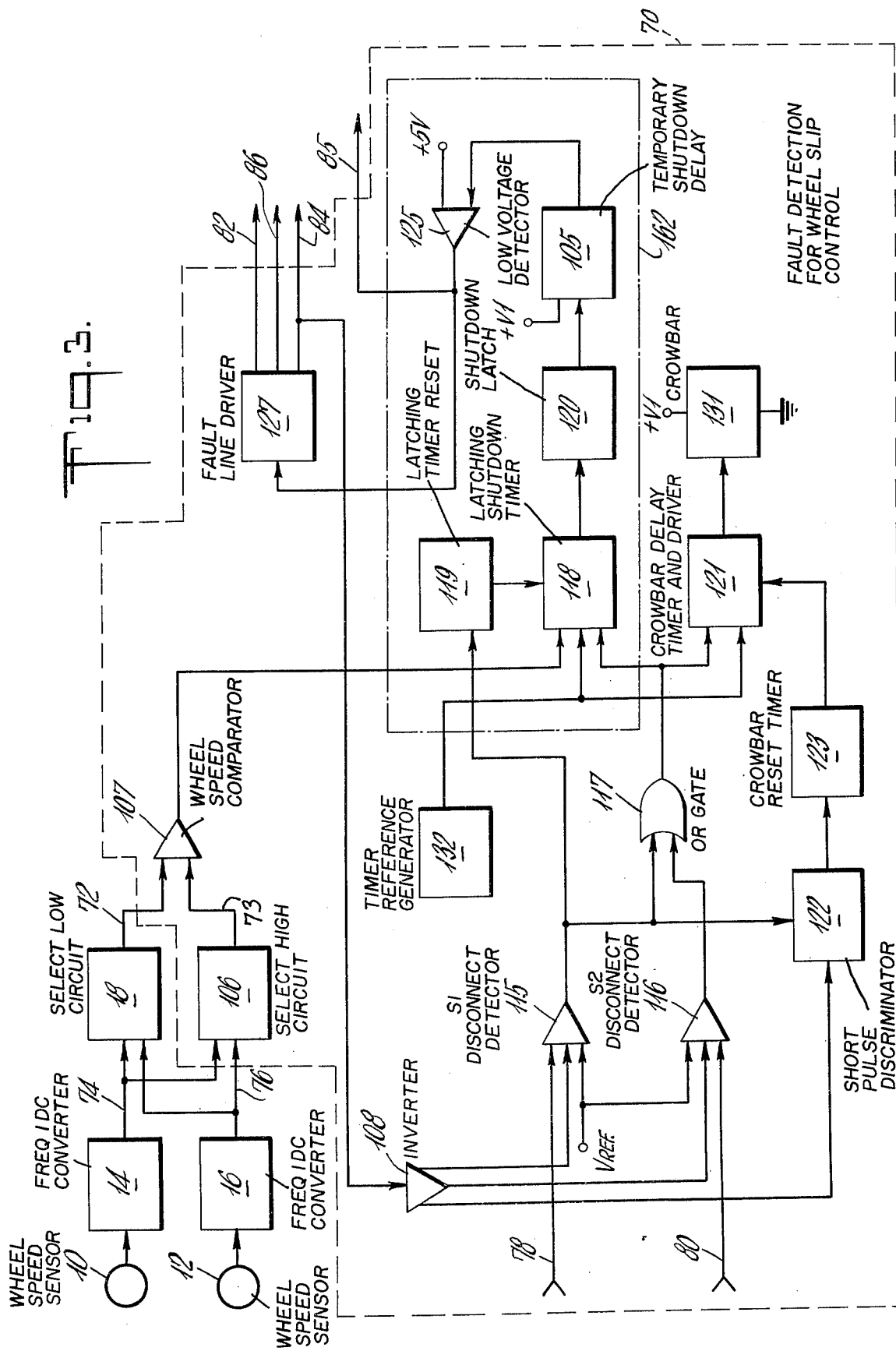

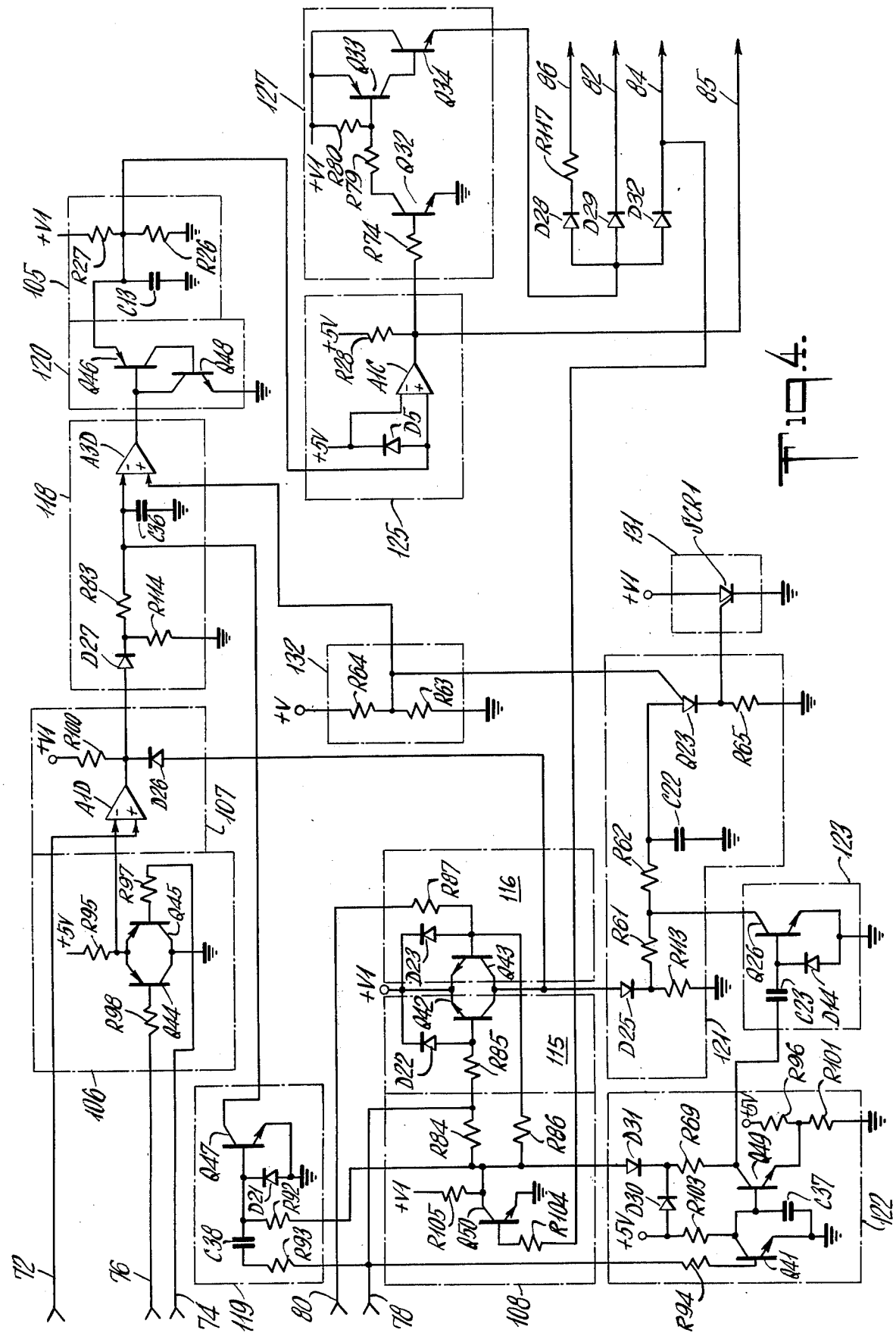

FAULT DETECTION FOR WHEEL SLIP CONTROL SYSTEM

CROSS REFERENCE TO RELATED APPLICATIONS

The fault detection system described herein is used with WHEEL SLIP CONTROL SYSTEM FOR AUTOMOTIVE VEHICLES AND THE LIKE, Ser. No. 546,270 filed on Feb. 3, 1975 in the name of Joseph E. Fleagle which matured into U.S. Pat. No. 3,951,467 issued Apr. 20, 1976 and application Ser. No. 218,378 WHEEL SLIP CONTROL SYSTEM FOR AUTOMOTIVE VEHICLES AND THE LIKE filed on Jan. 17, 1972 in the name of Joseph E. Fleagle which matured into U.S. Pat. No. 3,827,760 issued on Aug. 6, 1974. The present system may provide fault signals to FAILURE/MALFUNCTION WARNING CIRCUIT FOR WHEEL SLIP CONTROL SYSTEMS described and claimed in Ser. No. 505,734 filed on Sept. 13, 1974 in the name of Joseph E. Fleagle which matured into U.S. Pat. No. 3,911,392 issued Oct. 7, 1975. The present system may also be used advantageously with the modulator valve assemblies described and claimed in application Ser. No. 218,293 entitled BRAKE ANTI-LOCK MECHANISM filed on Jan. 17, 1962 in the name of John A. Machek, which matured into U.S. Pat. No. 3,759,167 issued on Sept. 11, 1973, in application number Ser. No. in 362,618 entitled BRAKE ANTI-LOCK MECHANISM filed on May 21, 1973 in the name of John A. Machek which matured into U.S. Pat. No. 3,881,779 and in application Ser. No. 369,966 entitled ANTI-LOCK BRAKE SYSTEM AND CONTROL VALVE THEREFOR filed on June 14, 1973 in the name of John A. Machek, which matured into U.S. Pat. No. 3,954,501. The disclosures of each and every one of the related applications set forth above and of any patents which have issued or may issue are hereby incorporated in the present application. The related applications set forth above have all been assigned to Wagner Electric Corporation, assignee of the present application. Utility of the present invention is not to be restricted to the above-identified patents and applications since the fault detection system of the present invention may be used to advantage in any vehicular wheel slip control system in which acceleration signals alone cause one level of brake relief and acceleration signals occurring simultaneously with a predetermined value of velocity change cause a second, more intense level of brake release.

SUMMARY OF THE INVENTION

The present invention is directed toward the disablement of an automatic wheel slip control system for vehicles whenever a fault in the system could cause hazardous conditions to arise. Wheel slip control systems, as contemplated in this application, operate by temporarily venting brake control fluid to release brake pressure upon detection of various conditions.

A fault in the wheel slip control system could so interfere with normal brake operation that dangerous conditions could arise. The present invention detects such faulty operation and shuts down the wheel slip control portion of the brake system either temporary, latching, or permanent, returning brake operation to normal.

Immediately following turn on of the wheel slip control system, spurious acceleration signals are generated while awaiting stabilization of the signals. If not prevented, these false signals would trigger the fault detection circuits into latching shutdown of the wheel slip control system every time the wheel slip control system is turned on. The fault detection system contains a temporary shutdown function to prevent this. The temporary shutdown inhibits wheel slip control system operation after turn on for a period long enough to enable the circuits to stabilize and prevent triggering of fault detection circuits. A similar temporary shutdown is also performed in response to certain conditions of low supply voltage.

This invention is intended to operate with a wheel slip control system wherein wheel speed is measured by point-type speed sensors well known in the art. The mechanical and electrical integrity of point-type sensors cannot be determined by a simple continuity check; but instead must be determined by indirect means. The present invention compares the apparent speed output to two different sensors. If a significant difference in apparent speed output persists for too long, the system interprets this speed difference as being a fault in one or the other of the sensors and shuts down and latches the wheel slip control system. Upon shutting down the wheel slip control system, the fault detection system also provides a warning indication to the operator. Following latching shutdown, the wheel slip control system can be restored to operation by removing and reapplying power.

If one or another of the solenoid valves of the wheel slip control system turns on and fails to turn off within a predetermined time, or if the signal cable from the solenoids is disconnected, the fault detection circuits interpret these as faults in the system and shut down and latch the system and provide a fault indication to the operator. Latching shutdown for whatever reason can be reset by removing and reapplying power to the fault detection system. If the solenoid energization is not terminated by the shutdown signals provided by the latching shutdown, permanent shutdown of the wheel slip control system is performed using a crowbar circuit which shorts a supply voltage to ground thereby blowing a fuse. Failure of a particular one of the solenoids, in the systems referenced in the cross reference to related applications, is considered more serious than failure in the other. When one of the solenoids is energized, it not only vents the brake control pressure, but also isolates the brake control system from the source of the control pressure. Simultaneous isolation and venting in this manner, if uncorrected, completely prevents braking action. This dangerous condition must be corrected with minimum delay. The fault detection system allows failure of this solenoid to go only to the end of a single crowbar timer cycle before causing permanent shutdown. The second solenoid merely vents control pressure without isolating. The fault detection system allows failures of the second solenoid to persist for one timing cycle of the latching shutdown timer plus one timing cycle of the crowbar timer before causing permanent shutdown. This shuts down the wheel slip control system until repairs are made and the fuse replaced.

Normal wheel slip control cycles of the first solenoid virtually always take place over a period exceeding 50 milli-seconds. Repeated solenoid actuations of duration less than 50 milli-seconds can be caused by cyclic faults in the point-type sensors due to misalignment, dirt, or damage. The faulty outputs may occur once per revolution of the wheel. If no action is taken, this rapid and repeated cycling of the solenoid would rapidly destroy the solenoid valve. The fault detection system prevents this destruction by permanent shutdown using the crowbar circuit as previously described.

BRIEF DESCRIPTION OF THE DRAWINGS

The present invention may be understood by reading the written description thereof with reference to the accompanying drawings wherein corresponding items in different figures are given the same numbers, of which:

FIG. 1 is a logic diagram of a typical wheel slip control system shown in copending patent application Ser. No. 546,270 which contains an embodiment of the present invention shown in the appropriately labeled box.

FIG. 2 is a functional diagram of the preferred embodiment of the fault detection in the labeled box of FIG. 1.

FIG. 3 is a logic diagram of the fault detection system of the present invention showing the processing of signals for the wheel slip control system illustrated in FIG. 1.

FIG. 4 is a detailed schematic diagram of the fault detection for wheel slip control system.

DETAILED DESCRIPTION OF THE PREFERRED EMBODIMENT

Referring to FIG. 1, the fault detection for wheel slip control system 70 is shown as it is normally connected into the logic circuits of a typical wheel slip control system. The wheel slip control system uses wheel speed information 74, 76, to detect the onset of a skid. The system used derived acceleration and velocity change information to control two solenoid valves S1, S2 which relieve the braking force applied to the wheels during solenoid valve energization. Although there are four possible combinations of on/off conditions of solenoid valves S1, S2 the following description is limited to a sequence of operation wherein solenoid valve S1 always operates first. Solenoid valve S2 may operate while S1 energized or it may remain off. If both S1 and S2 are energized, S2 is always deenergized first.

Solenoid energization signals 78, 80, connected to the fault detection for wheel slip control system 70 are processed to determine whether correct actuation of the solenoids is being achieved. If a solenoid fault is detected, either temporary or permanent shutdown of the wheel slip control system is performed depending on the type of fault detected. Shutdown is accomplished by a shutdown signal 82 connected to solenoid amplifiers 28, 40 which should inhibit the operation of the solenoids and by shutdown signals 84 and 85 to the wheel slip logic circuits to inhibit operation of the system. In addition, whenever temporary, latching or permanent shutdown is performed, an external warning indicator signal 86 is transmitted to a warning indicator which informs the operator that the system is shut down.

Wheel speed analog signals 74, 76 and a signal, 72, selected from the two wheel speed analog signals 74, 76 on the basis of whichever indicates lower speed are connected to the fault detection for wheel slip control system 70. The system monitors these inputs to detect a long term difference in apparent wheel speed inputs 74, 76 exceeding a predetermined threshold. When both the required time duration and magnitude of difference is detected, the system is shut down by shutdown signals 82, 84, and 85 accompanied by an external warning indicator signal 86 as previously described.

Referring specifically to the functional block diagram shown in FIG. 2, the following paragraphs describe the manner in which the fault detection for wheel slip control system generates a temporary, non-latching, shutdown for the wheel slip control system immediately following system turn on. Temporary shutdown delay 105 is interposed between voltage +V1 and low voltage detector 125. The operation of latching delay timer 162 is such that, if not prevented, it is triggered into generating a latching shutdown signal every time the system is turned on. Temporary shutdown delay 105 prevents latching delay timer 162 from latching during the first 80 milliseconds after turned on. During this period, temporary shutdown delay 105 enables low voltage detector 125 to generate a temporary shutdown signal 85 which, connected to the wheel slip control system logic circuits, prevents momentary venting of the brakes during this period. At the end of the 80-millisecond turn-on delay, temporary shutdown delay 105 automatically relinquishes control of shutdown. Similar temporary shutdown can be caused after turn-on by insufficient voltage on the +V1. This may occur due to low vehicle battery voltage during engine cranking. A subsequent fault detected by latching delay timer 162 causes latching shutdown as described in succeeding paragraphs.

The following paragraphs describe the manner in which the fault detection for wheel slip control system generates a latching resettable shutdown in response to apparent excessive differences in the outputs of two wheel speed sensors. The wheel speed analog voltage signals 74, 76 are connected to the input of select high circuit 106. Select high circuit 106 connects to its output whichever of its two inputs indicates higher speed. This higher speed wheel output 73 is connected to one input of a wheel speed comparator 107. The lower speed wheel signal 72 has been similarly selected by select low circuit 18 and connects to the other input of wheel speed comparator 107. When the difference between the higher and lower wheel speeds exceed a predetermined quantity the leading edge of a pulse signal is transmitted from wheel speed comparator 107 to trigger latching delay timer 162. Latching delay timer 162 begins a timing cycle which, if not interrupted, will trigger fault line driver 127 to shut down the system and provide a fault indication to the operator. Once the system is shut down in this manner it can be reset by removing and re-applying power to the fault detection for wheel slip control system. Interruption of the cycle of latching delay timer 162 is accomplished by the trailing edge of the solenoid S1 actuation 78 which is transmitted to the reset input of latching delay timer 162 through S1 disconnect detector 115. In normal operation the solenoid S1 completes its on-off cycle substantially before the end of the delay time of latching timer 162. Consequently, latching delay timer 162 is normally reset before it is able to transmit a shut-down command.

The following paragraphs describe the manner in which the fault detection for wheel slip control system generates a latching shutdown signal in response to faults in the wheel slip control system which cause either of the solenoids S1, S2 to remain energized longer than a predetermined time.

If Solenoid S1 or S2 turns on but solenoid S1 fails to turn off for any reason, latching delay timer 162 is triggered on by the leading edge of the S1 or S2 actuation pulse 78, 80 but, in the absence of a trailing edge of the S1 pulse 78 to the reset input of latching delay timer 162 before its period is completed, latching delay timer 162 connects a trigger pulse to fault line driver 127 which shuts down the wheel slip control system and provides a fault indication to the operator.

Crowbar delay timer and driver 121 is triggered on by a signal indicating the beginning of actuation of either solenoid S1 78 or S2 80 connected through S1 disconnector detector 115 or S2 disconnect detector 116, respectively. If the delay period of crowbar delay timer and driver 121 is completed before a reset is received from crowbar delay timer reset 123, a fire signal is transmitted to crowbar 131. Crowbar 131 provides a short circuit to ground for voltage +V1 thereby blowing a fuse in the supply circuit. Crowbar delay timer reset 123 is triggered into operation by the termination of the solenoid S1 actuation pulse 78. The S1 pulse 78 is normally terminated before the timeout of crowbar delay timer and driver 121, thereby resetting crowbar delay timer and driver 121. Crowbar delay timer and driver 121 normally does not generate a fire signal due merely to the failure of solenoid S1 to turn off. The time delay of crowbar delay timer and driver 121 is substantially longer than the time delay of latching delay timer 162. Consequently, while both latching delay timer 162 and crowbar delay timer and driver 121 are turned on simultaneously by S1 or S2 signals 78, 80, latching delay timer 162 always times out first. The signal from latching delay timer 162 causes fault line driver 127 to transmit shutdown signals to the remainder of the wheel slip control system which usually forces the cessation of both solenoid S1 and S2 signals 78, 80. The negative-going trailing edge of the solenoid S1 energization signal 78 is effective to trigger crowbar delay timer reset 123 to immediatley reset crowbar delay timer and driver 121. Provided that the shutdown signals to the wheel slip control system and the solenoids are successful in causing deenergization of the solenoids, the cycle stops here. The latching shutdown timer 162 remains latched and the crowbar 131 remains unfired. The fault detection system can be reset, and the wheel slip control system restored to normal operation by removing and reapplying power.

It is possible to have faults in the external circuits or solenoids which do not respond to the inhibit signals from fault line driver 127 to de-energize the solenoids. The following describes the manner in which the fault detection for wheel slip control system permanently shuts down the system in response to this condition. If the initial cause of the fault was continued energization of solenoid S1, and if solenoid S1 remains energized after latching shutdown, no negative-going trailing edge is available to crowbar delay timer reset 123 to enable it to generate a reset pulse. Consequently, crowbar delay timer and driver 121 is allowed to complete its cycle. At the end of its timing cycle, crowbar delay timer and driver 121 connects a fire signal to crowbar 131 which enables crowbar 131 to provide a short circuit to supply voltage +V1 thereby blowing a fuse in the supply circuit. If the initial cause of the fault was continued energization of solenoid S2, the latching shutdown signal 84 is connected through short-pulse discriminator 122 to crowbar delay timer reset 123. The initiation of the latching shutdown signal is effective to trigger a reset pulse from crowbar delay timer reset 123. The crowbar delay timer and driver 121 is reset. However, the continuing energization signal 80 from energized solenoid S2 connected to the input of crowbar delay timer and driver 121 through S2 disconnect detector 116 causes crowbar timer and driver 121 to immediately begin a new timing cycle. Since latching delay timer 162 is latched, it can no longer provide a reset trigger signal through fault line driver 127 and short-pulse discriminator 122 to crowbar delay timer reset 123. There is thus nothing to interfere with the completion of the timing cycle of crowbar delay timer and driver 121. At the end of this second timing cycle, assuming that solenoid S2 has not become deenergized in the meantime, no negative-going trailing edge is effective to generate a reset pulse. Thus, crowbar timer and driver 121 transmits a fire signal to crowbar 131. When the crowbar 131 fires, a fuse in the power supply in the wheel slip control system is blown. This permanently disables the wheel slip control system until repairs are made and the fuse is replaced.

The following paragraph describes how the fault detection for wheel slip control system performs latching shuts down of the wheel slip control system when it detects open cables or open solenoid windings. Permanent shutdown is avoided in this case.

S1 disconnect detector 115 and S2 disconnect 116 respond to open circuits in the signal lines from either solenoid S1 or S2 by producing an output which latching delay timer 162 interprets in the same way as an initiated but non-terminated pulse from either solenoid. When the signal cable from solenoid S1 and/or S2 is disconnected or a solenoid winding is open, both latching delay timer 162 and crowbar delay timer and driver 121 are triggered into beginning their respective timing cycles. If the condition of disconnected cable or open coil persists for longer than the delay period of latching delay timer 162, the latching delay timer 162 produces a trigger pulse which causes fault line driver 127 to inhibit the solenoids and provide a warning indication to the operator. The delay time of crowbar delay timer and driver 121 is substantially longer than the delay time of latching delay timer 162. Consequently, the latching wheel slip control system shutdown signals 82, 84 from fault line driver 127 and are transmitted to external circuits well before crowbar delay timer and driver 121 times out. The latching shutdown signal 84 fed back from fault line driver 127 through inverter 108 to S1 disconnect detector 115 and S2 disconnect detector 116 simulates the end of a normal S1 and S2 actuation to crowbar delay timer reset 123. Crowbar delay timer reset 123 is thereby enabled to generate a reset pulse which is effective to reset crowbar delay timer and driver 121. The cycle ends here. Crowbar 131 is therefore not fired by the occurence of disconnected cables or open solenoid windings. Latching shutdown is reset by momentarily removing and reapplying the power to the system.

Cyclic faults in the point-type speed sensor in one or another of the wheels being monitored, resulting from misalignment, dirt or damage can cause spurious actuation of solenoid S1 every rotation of the wheel. This condition could quickly destroy the wheel slip control system solenoid valve. The following paragraphs describe the method whereby permanent shutdown is achieved in response to faults of this nature.

Spurious solenoid actuation from cyclic sensors faults normally persists for less than 50 milliseconds at highway speeds whereas normal wheel slip control system energizations of solenoid S1 are usually longer than 50 milliseconds. Short-pulse discriminator 122 blocks the first 50 milliseconds of the solenoid S1 energization pulse 78. Consequently, if an energization pulse shorter than 50 milliseconds is transmitted by solenoid S1 it is entirely blocked by short pulse discriminator 122 and is not transmitted to crowbar delay timer reset 123. Crowbar delay timer and driver 121 begins its timeout upon the initiation of the S1 energization pulse 78. Since a reset cannot be generated by solenoid input pulses shorter than 50 milliseconds, crowbar timer and driver 121 has nothing which prevents it from completing its timeout cycle and connecting a fire signal to crowbar 131. Crowbar 131 then provides a short circuit to ground for supply voltage +V1 thereby blowing a fuse. The wheel slip control system and fault detection for wheel slip control system can be restored to operation after repair by replacing the fuse.

Referring now to the logic diagram shown in FIG. 3 wherein the numbering of blocks corresponds to the numbering in FIGS. 1 and 2. Latching delay timer 162 in FIG. 2 is comprised of latching timer reset 119, latching shutdown timer 118, shutdown latch 120, temporary shutdown delay 105, and low voltage detector 125.

Left wheel speed sensor 10 and frequency-to-DC converter 14 provide an analog signal in parallel to select-low circuit 18 and select high circuit 106. Similarly, right wheel speed sensor 12 and frequency-to-DC converter 16 connect an analog signal in parallel to select-low circuit 18 and select-high circuit 106. Select-low circuit 18 connects to its output whichever of its two inputs indicate lower speed. Conversely, select high circuit 106 connects to its output whichever its inputs indicate high speed. Wheel speed comparator 107 compares its two inputs and, when the difference between them exceeds a pre-determined threshold, connects a trigger signal to latching shutdown timer 118. Latching shutdown timer 118 begins its timeout sequence which is terminated either by a resetting output from latching timer reset 119 or by completion of its cycle occurring when an internal reference voltage in latching shutdown timer 118 exceeds an external reference voltage generated by timer reference generator 132. If the internal voltage in latching shutdown timer 118 exceeds the reference voltage from timer reference generator 132 before the reset pulse is received from latching timer reset 119, a latching shutdown command is transmitted to shutdown latch 120. The output of shutdown latch 120 is normally connected through temporary shutdown delay 105 to low voltage detector 125. When shutdown latch 120 is triggered at the completion of the timing cycle of latching shutdown timer 118 low voltage detector 125 transmits a fault signal to fault line driver 127. Fault line driver 127 transmits wheel slip control system shutdown signals 82, 84, 86 to wheel slip control system circuits, a warning indicator signal 86 to an external warning indicator, and a fault signal to inverter 108. The fault signal is inverted in inverter 108 and connected to the inputs of S1 disconnect detector 115 and S2 disconnect detector 116 and to short-pulse discriminator 122.

Immediately after initial turn on, temporary shutdown delay 105 prevents shutdown latch 120 from entering the latched condition for 80 milliseconds after application of supply voltage +V1. During this delay period, temporary shutdown latch 105 also triggers low voltage detector 125 into temporarily providing shutdown signals 82, 84, and 85 to wheel slip control system. At the end of the initial 80 milliseconds, temporary shutdown delay 105 automatically removes the shutdown signals and restores the fault detection circuits to operation as previously described.

The operation of S1 disconnect detector 115 and S2 disconnect detector 116 are identical, thus only S1 disconnect 115 will be described in detail. A large value resistor (see FIG. 4, R84) in the output of inverter 108 is effectively in parallel with the very low internal resistance of solenoid S1 as seen by the input to S1 disconnect detector 115. Consequently the output of S1 solenoid disconnect detector 115 normally follows the pulse-type electrical signal input 78 from solenoid S1. However, when the signal cable from solenoid S1 is disconnected or when an open circuit exists in the winding of solenoid S1, the input to S1 disconnect detector 114 sees only the normal low output of inverter 108. In this situation, the timing cycle of latching shutdown timer 118 and crowbar delay timer and driver 121 are begun. At the completion of the timing cycle of latching shutdown timer 118, fault line driver 127 puts out its fault signal. The resulting high output of inverter 108 is connected to the input of S1 disconnect detector 115 and S2 disconnect detector 116. In the absence of a real input from the solenoids, the two disconnect detectors interpret this high signal as a de-energization of their respective solenoids. A resetting input is connected to short-pulse discriminator 122 as in normal reset of the crowbar delay timer reset 123. This resetting input is timed to produce an input to crowbar timer and driver 121 before this circuit has had time to fire crowbar 131. At the end of this cycle, latching shutdown removes the wheel slip control system from operation until reset by removing and reapplying power. The crowbar remains untriggered.

In normal operation, crowbar delay timer and driver 121 is triggered into beginning its timing cycle by solenoid S1 and S2 signals 78, 80 through OR gate 117. The running of crowbar delay timer and driver 121 is terminated either by the reception of a reset pulse from crowbar delay timer reset 123 or by completing its cycle whereby an internal voltage exceeds the reference voltage input provided by timer reference generator 123. If the completion of the timing cycle is achieved before a reset is received, crowbar delay timer and driver 121 transmits a fire signal to crowbar 131. Crowbar delay timer and driver 121 is usually reset by the reset pulse from crowbar delay timer reset 123 in response to the negative going trailing edge of the S1 solenoid pulse. Shortpulse discriminator 122 blocks the S1 signal for the first 50 milliseconds after the S1 solenoid signal begins. Consequently, although an S1 pulse shorter than 50 milliseconds can trigger crowbar delay timer and driver 121 on, such a pulse is too short to pass short-pulse discriminator 122. Therefore, no negative-going trailing edge is available to trigger crowbar delay timer reset 123. Crowbar delay timer and driver 121 completes its timing cycle whereupon it transmits a fire signal to crowbar 131. Crowbar 131 provides a short circuit for supply voltage +V1 to ground. The fuse in the +V1 supply voltage circuit is blown thereby disabling the wheel slip control system until repairs are completed on the fuse replaced. Removal of +V1 from fault line driver 127 causes fault line driver 127 to transmit a warning signal 86 to external indicators. In addition, fault line driver 127 transmits shutdown signals 82, 84, 86 to the solenoid amplifiers and to other circuits of the wheel slip control system, which shut down the wheel slip control system, and inhibit inputs to the solenoids.

Referring now to the schematic diagram in FIG. 4, wherein circuit functions shown in previous drawings are outlined and indentified.

Analog voltages varying with left and right wheel speeds 74, 76 are connected to R97 and R98 of select high circuit 106. Q44 and Q45 operate as a switch such that they connect to their output a signal which varies directly with whichever of their inputs indicates higher wheel speed. This high speed wheel signal is connected to one input of comparator A1D. A selectlow function is normally performed in the wheel slip control system. The resulting low speed wheel signal 72 is connected to the other input of comparator A1D. For equal wheel speeds, the high-speed input to A1D is 1.2 volts more positive than the low-speed input. For increasing speed the input voltages to A1D become less positive. Immediately that the high-speed input to A1D decreases past the low-speed input, the output from comparator A1D appearing across R100 switches from low to high. A charging path is established through D27 and R83 to begin charging timing capacitor C36. As capacitor C36 charges up, the voltage fed to A3D increases. When the voltage across C36 becomes more positive than the reference voltage generated by timer reference generator 132, consisting of resistors R64 and R63, the output of A3D switches low. Resistor R114 is a high value resistor included to drain off small charges accumulating in C36.

Transistors Q46 and Q48 comprise the shutdown latch 120. When the output of A3D goes low, transistor Q46 conducts through its emitter-collector junction, thereby providing a positive control voltage at the base of Q48. Q48 is turned on by this control voltage thereby providing a connection to ground through the emitter-collector junction of Q48 to the base of Q46.

This function of Q46 and Q48 is self-sustaining regardless the later condition of inputs to A3D. Q46 being held on by the ground at its base provided through Q48; and Q48 being held on by the positive voltage fed to its base through Q46.

Capacitor C13 and resistors R26 and R27 comprise temporary shutdown delay 105. Immediately after system turn on, capacitor C13 holds the emitter of Q46 close to zero for a finite period while being charging up through R27. Q46 consequently is unable to turn on. For this period, the shutdown latch Q46, Q48 is prevented from entering the latched condition. However, the low voltage presented to the positive input of low voltage detector A1C during this period is sufficient to produce a temporary fault output as described in the following paragraph. At the end of approximately 80 milliseconds after turn on, C13 is charged up sufficiently to allow the shutdown latch 120 to operate normally.

Low voltage detector 125 is made up of resistor R28, amplifier A1C, and diode D5. When the low voltage detector 125 is triggered on during the time cycle of temporary shutdown delay 105, or by operation of shutdown latch 120, the voltage at the junction of R26 and R27 drops below 5 volts, causing the output of A1C to switch from low to high. Transistor Q32, normally on, is turned off by the change in condition of A1C. This causes the voltage at the junction of R80 and R79 to increase. The increase voltage at the junction R79 and R80 turns off Q33 and Q34. This removes the high output normally delivered to diodes D28, D29, and D32. A low external warning signal 86 is provided to external warning indicators through diode D28 and protective resistor R117. System shutdown signals 82, 84 are provided to external solenoid drivers through D29 and to wheel slip control circuits through D32. A system shutdown signal 85 is also provided directly from the output of low voltage detector 125.

Latching timer reset 119 is made up of transistor Q47, resistors R92 and R93, capacitor C38, and diode D21. When triggered, Q47 rapidly discharges timing capacitor C36 to ground through its collect-emitter junction. When the input from solenoid S1 returns to high at the end of a solenoid actuation cycle, transistor Q47 is triggered on through R93 and C38. Diode D21 clamps the base of Q47 to ground in case of any negative charge being stored in C38.

Latching timer reset 119 is also triggered at its base through R92 by inverter 108 which is made up of transistor Q40 and resistors R84, R86, R104, and R105 whenever a fault signal is generated.

Inverter 108 is triggered by the negative-going fault signal connected from fault line driver 127 through D32 and R104 to the base of Q50. This cuts off transistor Q50. The collector of Q50 goes high and this high voltage is connected through R92 to Q47. Q47 turns on and remains on until shutdown latch 120 is reset. This insures that timer capacitor C36 remains discharged during latching shutdown.

Resistors R84 and R86 in inverter 108 are connected to the outboard ends of resistors R85 and R87 which normally take the inputs from solenoids S1 and S2 respectively. R84 and R86 are 10K ohms as compared to the internal resistance of the solenoid coils of only a few ohms. If the solenoid coils open up, or the cables are disconnected, the untriggered low voltage from the collector of Q50 is effectively connected through R85 or R87 to the disconnect detector transistors Q42 or Q43. The normal low output of inverter 108 triggers on one or both disconnect detector transistors Q42, Q43. The apparent solenoid fault signal is connected through diode D26 to latching shutdown timer 118 and through diode D25 to crowbar timer and driver 121. The apparent fault signal starts the cycles of the two timers 118, 121. At the end of the latching shutdown timer 118 cycle the resulting high output of inverter 108 is connected through R84 and R93 to latching timer reset 119 and through R86 and R94 of short pulse discriminator 122 to crowbar timer reset 123. The resulting reset input to crowbar timer and driver 121 causes it to be reset in the event of an open solenoid coil or disconnected cables without crowbar 131 fire resulting in blowing the system fuse.

Normal actuation signals 78, 80, of solenoids S1 and S2 are connected through R85 and R87 respectively to the solenoid disconnect detectors 115 and 116. When properly connected, the low internal resistance of the solenoids as compared to inverter 108 output resistors R84 and R86 causes S1 and S2 disconnect detectors 115, 116 to see only the solenoid inputs, thereby overcoming any possibility of control by signals from inverter 108. The interconnected emitters and collectors of transistors Q42 and Q43 function as OR gate 117 shown in FIG. 3. Upon the beginning of either solenoid S1 or S2 energization, the positive voltage connected through diode D25 and resistors R61 and R62 begins to charge crowbar timer capacitor C22. Resistor R113 is a high value resistor intended to drain off small charges accumulating in C22. When the charge in C22 increases past the voltage generated by timer reference generator resistors R64 and R63, unijunction transistors Q23 is turned on. The resulting positive voltage at the gate electrode of SCR1 causes SCR1 to turn on and provide a short-circuit path to ground for supply voltage +V1.

Prior to the onset of the solenoid S1 energization, transistor Q41 in short pulse discriminator 122 is normally on and capacitor C37 is discharged through the emitter-collector junction of Q41. The low input resulting from solenoid S1 energization 78 turns off transistor Q41 and allows C37 to begin charging through R103. After approximately 50 milliseconds, capacitor C37 is charged up to a voltage which exceeds the voltage at the junction of voltage divider R96 and R101 by the base-emitter drop in transistor Q49. If the solenoid S1 energization pulse 78 input to Q41 ceases before 50 milliseconds has elapsed Q41, immediately discharges C37 at the end of the short solenoid S1 energization without passing on a reset pulse to Q49. This results in depriving crowbar timer reset 123 of a reset trigger for any pulses of duration shorter than 50 milliseconds. Assuming that a pulse longer than 50 milliseconds is received, Q49 is turned on when C37 charges up to approximately 3.1 volts. The negative-going voltage at the collector of Q49, connected through C23 is shunted to ground through D14. At the end of the solenoid S1 energization pulse 78, the AC positive-going trailing edge of the signal at the collector of Q49 is connected through C23 to the base of Q26. Q26 is turned on. Crowbar timer capacitor C22 is rapidly discharged through the small resistance of R62 and the collector-emitter junction of Q26.

If, for any reason, the solenoid S1 energization signal 78 fails to be terminated by the shutdown signals transmitted to the wheel slip control system, the continued low input to Q41 maintains Q41 cut off. The voltage across C37 remains at approximately 3.1 volts, being held there by the base emitter current through Q49. Q49 receives +4.4 volts at its collector through D30. In this condition, Q49 remains conducting as long as the solenoid S1 energization pulse 78 continues. Since Q49 cannot be shut off, the charge stored in C23 is not available to trigger crowbar timer reset transistor Q26. Thus, crowbar timer capacitor C22 continues to charge toward completion of the crowbar timer and driver 121 timing cycle.

Conversely, if the solenoid S2 energization signal 80 fails to be terminated by the shutdown signals transmitted to the wheel slip control system, the positive going leading edge of the high output from inverter transistor Q50, connected through D31 and R69, is transmitted through coupling capacitor C23 to trigger on crowbar timer reset transistor Q26. Crowbar timer capacitor C22 is discharged through Q26 as in a normal reset. However, as soon as the charge in coupling capacitor C23 leaks off, crowbar timer reset transistor Q26 is again shut off. If the solenoid S2 energization signal 80 continues, C22 begins to charge again through the collector-emitter junction of Q43, diode D25, and resistors R61 and R62. The latching shutdown circuits now being latched, there can be no more reset signals available from inverter 108. Crowbar timer and driver 121 continues its cycle to completion resulting in crowbar 131 fire and permanent system shutdown.

In the preferred embodiment shown in FIG. 4, the various components are as follows:

| Resistances (in ohms) | | Capitances (in microfarads) | |
|---|---|---|---|
| R1 | - 22K | C1 | - .047 |
| R2 | - 10K | C3 | - .047 |
| R3 | - 12K | C4 | - .01 |
| R4 | - 2.2K | C5 | - .01 |
| R5 | - 47K | C6 | - 0.1 |
| R6 | - 5.6K | C7 | - .047 |
| R7 | - 71.5K | C8 | - .01 |
| R8 | - 150K | C9 | - .01 |
| R9 | - 100K | C10 | - 0.1 |
| R10 | - 680 | C11 | - .047 |
| R11 | - 680 | C12 | - .047 |
| R12 | - 22K | C13 | - 1.0 |
| R13 | - 10K | C14 | - 0.27 |
| R14 | - 120K | C15 | - 1.5 |
| R15 | - 2.2K | C16 | - 0.1 |
| R16 | - 71.5K | C17 | - 0.1 |
| R17 | - 47K | C18 | - 4.7 |
| R18 | - 5.6K | C19 | - 0.47 |
| R19 | - 150K | C20 | - 0.22 |
| R20 | - 100K | C21 | - 4.7 |
| R21 | - 1K | C22 | - 4.7 |
| R22 | - 20K | C23 | - 0.22 |
| R23 | - 7.87K | C24 | - 50 |
| R24 | - 71.5K | C25 | - .047 |
| R25 | - 343K | C26 | - 0.47 |
| R26 | - 90.9K | C27 | - 0.22 |
| R27 | - 43.2K | C30 | - 500 |
| R28 | - 5.6K | C31 | - 0.1 |
| R29 | - 47K | C32 | - 4.7 |
| R30 | - 5.6K | C36 | - 4.7 |
| R31 | - 1.5M | C37 | - 1.0 |
| R32 | - 49.9K | C38 | - 0.22 |
| R33 | - 6.81K | C39 | - 4.7 |
| R34 | - 6.81K | C40 | - 470 pf to 1000 pf |
| R35 | - 120K | C41 | - 470 pf to 1000 pf |
| R36 | - 150K | C42 | - 470 pf to 1000 pf |
| R37 | - 5.6K | C43 | - 470 pf to 1000 pf |
| R38 | - 100K | | |
| R39 | - 2K | | |
| R41 | - 12K | | |
| R42 | - 5.1K | | |
| R43 | - 24K | | |
| R44 | - 33K | Diodes | |
| R45 | - 5.1K | D1 | - IN914 or IN4148 |
| R46 | - 1K | D2 | - IN914 or IN4148 |
| R47 | - 22K | D3 | - IN914 or IN4148 |
| R48 | - 22K | D4 | - IN914 or IN4148 |
| R51 | - 47K | D5 | - IN914 or IN4148 |
| R52 | - 47K | D6 | - FD-333 |
| R53 | - 47K | D7 | - IN914 or IN4148 |
| R54 | - 430K | D8 | - IN4004 |
| R55 | - 1.5K | D9 | - IN914 or IN4148 |
| R56 | - 120 | D10 | - IN4004 |
| R57 | - 1.5K | D11 | - IN4731A |
| R58 | - 1.5K | D12 | - IN4754 |
| R59 | - 120 | D13 | - IN4754 |
| R60 | - 1.5K | D14 | - IN914 or IN4148 |
| R61 | - 430K | D15 | - IN914 or IN4148 |
| R62 | - 1.5K | D16 | - IN914 or IN4148 |
| R63 | - 20K | D17 | - IN914 or IN4148 |
| R64 | - 10K | D19 | - IN914 or IN4148 |
| R65 | - 680 | D20 | - IN914 or IN4148 |
| R69 | - 100K | D21 | - IN914 or IN4148 |
| R70 | - 680 | D22 | - IN914 or IN4148 |
| R71 | - 22 | D23 | - IN914 or IN4148 |
| R73 | - 750 | D24 | - IN4004 |
| R74 | - 100K | D25 | - IN914 or IN4148 |
| R76 | - 560K | D26 | - IN914 or IN4148 |
| R79 | - 22K | D27 | - IN914 or IN4148 |
| R80 | - 22K | D28 | - IN4004 |
| R81 | - 51K | D29 | - IN4004 |
| R82 | - 51K | D30 | - IN914 or IN4148 |
| R83 | - 390K | D31 | - IN914 or IN4148 |
| R84 | - 10K | D32 | - IN914 or IN4148 |
| R85 | - 100K | | |
| R86 | - 10K | Transistors | |
| R87 | - 100K | | |
| R88 | - 330K | Q1 | - 2N4248 |
| R92 | - 430K | Q2 | - 2N3565 |
| R93 | - 100K | Q3 | - 2N4148 |
| R94 | - 1.5M | Q4 | - 2N4148 |
| R95 | - 100K | Q5 | - 2N3565 |

-continued

| Resistances (in ohms) | | Capitances (in microfarads) | |
|---|---|---|---|
| R96 | 1K | Q6 | 2N4248 |
| R97 | 150K | Q7 | 2N3565 |
| R98 | 150K | Q8 | 2N3565 |
| R99 | 47K | Q10 | 2N3565 |
| R100 | 5.6K | Q11 | 2N4250 |
| R101 | 1K | Q13 | 2N4250 |
| R102 | 22K | Q14 | 2N4220 or 2N4393 |
| R103 | 75K | Q15 | 2N4248 |
| R104 | 5.6K | Q16 | 2N3565 |
| R105 | 1K | Q17 | 2N3565 |
| R106 | 12K | Q18 | 2N3565 |
| R107 | 120K | Q19 | 2N3567 |
| R108 | 100K | Q20 | 65104 |
| R109 | 100K | Q21 | 2N3567 |
| R110 | 10K | Q22 | 65104 |
| R111 | 1K | Q23 | 2N6027 |
| R112 | 1K | Q26 | 2N3565 |
| R113 | 6.8M | Q27 | 65104 |
| R114 | 100K | Q28 | 2N3565 |
| R117 | 470 | Q31 | 2N3565 |
| R118 | 430K | Q32 | 2N3565 |
| R119 | 24K | Q33 | 2N4248 |
| | | Q34 | 65104 |
| | | Q35 | 2N3565 |
| | | Q36 | 2N4248 |
| | | Q37 | 2N4250 |
| Integrated Circuits | | Q39 | 2N3565 |
| | | Q40 | 2N3565 |
| A1 | SC5135PK | Q41 | 2N3565 |
| A2 | AD502IN | Q42 | 2N4248 |
| A3 | SC5135PK | Q43 | 2N4248 |
| A4 | MC849P | Q44 | 2N4250 |
| A5 | MC849P | Q45 | 2N4250 |
| | | Q46 | 2N4248 |
| | | Q47 | 2N3565 |
| | | Q48 | 2N3565 |
| Silicon Controller Rectifier | | Q49 | 2N3565 |
| | | Q50 | 2N3567 |
| | | Q51 | 2N4248 |
| SCR1 | C122A | Q52 | 2N3565 |

What is claimed is:

1. In a wheel slip control system having electric solenoids therein which are energized by an electric pulse in response to a logic circuit, and further having at least two point-type speed sensors which generate electrical signals having amplitudes proportional to wheel speeds, the invention of a fault detection system comprising:
   a. a first cyclic timing means operable in response to at least a first wheel slip control system signal to begin a timing cycle;
   b. means for resetting said first cyclic timing means in response to at least a second wheel slip control system signal provided that said second wheel slip control system signal occurs before the end of the timing cycle of said first cyclic timing means;
   c. means for generating a first wheel slip control system shutdown signal when said first cyclic timing means fails to be reset before the end of its timing cycle;
   d. a second cyclic timing means operable in response to at least a third wheel slip control system signal to begin a timing cycle;
   e. means for resetting said second cyclic timing means in response to said second wheel slip control system signal provided that said second wheel slip control system signal occurs before the end of the timing cycle of said cycle of said second cyclic timing means;
   f. means for inhibiting the resetting of said second cyclic timing means in response to said second wheel slip control system signal having a predetermined characteristic; and
   g. means for generating a second wheel slip control system shutdown signal when said second cyclic timing means fails to be reset before the end of its timing cycle.

2. A wheel slip control system as recited in claim 1 wherein said first wheel slip control system signal is the energization signal of at least one electric solenoid.

3. A wheel slip control system as recited in claim 2 wherein said second wheel slip control system signal is the trailing edge of the energization signal of at least one electric solenoid.

4. A wheel slip control system as recited in claim 1 further comprising:
   a. wheel speed comparison means for comparing the apparent speed difference of at least two wheels;
   b. means for generating said first wheel slip control system signal when said apparent speed difference exceeds a predetermined value.

5. A wheel slip control system as recited in claim 1 wherein said third wheel slip control system signal is the energization signal of at least one electric solenoid.

6. A wheel slip control system as recited in claim 5 wherein said second wheel slip control system signal is the trailing edge of the energization signal of at least one electric solenoid.

7. A wheel slip control system as recited in claim 6 wherein energization signals of said at least one electric solenoid of duration shorter than a predetermined time inhibit the resetting of said second cyclic timing means.

8. A wheel slip control system as recited in claim 1 wherein said first wheel slip control system shutdown signal is a latching shutdown which is resettable by removal and reapplication of system power.

9. A wheel slip control system as recited in claim 1 wherein said second wheel slip control system shutdown signal is a permanent shutdown which is resettable by replacement of a fuse.

10. A wheel slip control system as recited in claim 1 further comprising:
    a. said second cyclic timing means having a timing period longer than the timing period of said first cyclic timing means;
    b. means for triggering both first and second cyclic timing means into beginning their timing cycles in response to the detection of open signal cables from at least one electric solenoid or at least one open solenoid coil;
    c. means for resetting said second cyclic timing means upon the completion of the cycle of said first cyclic timing means whereby generation of said second wheel slip control system shutdown signal is prevented.

11. In a wheel slip control system having electric solenoids therein which are energized by an electric pulse in response to a logic circuit, and further having at least two point-type speed sensors which generate electrical signals having amplitudes proportional to wheel speeds, the invention of a fault detection system comprising:
    a. a cyclic timing means;
    b. wheel speed comparison means for comparing the apparent speed difference of at least two wheels;
    c. triggering means for actuating said cyclic timing means when said apparent speed difference exceeds a predetermined value;
    d. means for generating an electric output adapted to temporarily shut down the said wheel slip control system upon the completion of the timing cycle of the said cyclic timing means;

e. means for resetting said cyclic timing means before the completion of its timing cycle thereby avoiding shutdown of the wheel slip control system; and f. said means for resetting said cyclic timing means being actuated by the termination of an energization pulse of at least one of said electric solenoids.

12. A wheel slip control for wheel slip control system as recited in claim 11 wherein said wheel speed comparison means is composed of;

a. a select-low circuit means receiving at its two inputs wheel speed outputs of at least two wheel speed sensors, and providing at its output, whichever of its inputs indicates the lowest speed;

b. a select-high circuit means receiving at its inputs the wheel speed signals of at least wheel speed sensors and providing at its output whichever of its inputs indicates the higher wheel speed;

c. wheel speed comparator means operative to compare the signals at its inputs from said select-low circuit means and said select-high circuit means, and, when the difference between the two input signals becomes great enough, said wheel speed comparator means being operative to generate an output signal indicative of the difference exceeding a predetermined value; and d. means for connecting the output of the said wheel speed comparator means to trigger said cyclic timing means.

13. A wheel slip control for wheel slip control system as recited in claim 11 wherein said cyclic timing means includes:

a. latching shutdown timer means;

b. a timer reference generator which provides a reference voltage against which an internal voltage in said latching shutdown timer means is compared, whenever the internal voltage in the said latching shutdown timer exceeds said reference voltage said latching shutdown timer means generates a latching shutdown signal.

14. A wheel slip control for wheel slip control system as recited in claim 12, wherein said means for generating an electric output adapted to latching shutdown of the said wheel slip control system comprises:

a. a shutdown latch means operative to change its output from untriggered to triggered upon receiving at its input the signal indicating the end of the timing cycle of said latching shutdown timer means, said shutdown latch being thereafter insensitive to additional changes in its input, remaining in the triggered condition;

b. low voltage detector means operative to receive the output of said shutdown latch means, said low voltage detector means being operative to generate a fault signal when the output of said shutdown latch means switches from untriggered to triggered; and c. fault line driver means which receives the fault signal from said low voltage detector means, said fault line driver means being operative to generate shutdown signals to the said wheel slip control system and an external warning indication to the operator upon the receipt therein of said fault signal from said low voltage detector means.

15. A wheel slip control for wheel slip control as recited in claim 14 wherein a temporary shutdown delay means connects a temporary fault signal to said low voltage detector means during the time period immediately after system turn on and when certain supply voltage levels are below a predetermined level, said temporary shutdown delay means being operative to prevent said shutdown latch means from going into its latched condition during the time period or supply voltage condition which operates it, said temporary shutdown delay means being also operative to automatically restore normal fault detection circuit operation at the conclusion of the time period or low supply voltage condition.

16. A wheel slip control for skid control system as recited in claim 12 wherein said means for resetting said cyclic timing means comprises latching timer reset means receiving the energization pulse of at least one of said electric solenoids, said latching timer reset means being operative to generate a reset output connected to said latching shutdown timer means upon the receipt at the input to said latching timer reset means of the trailing edge of the energization pulse from the at least one of said electric solenoids, said reset pulse being effective to terminate the cycle of said latching shutdown timer means and, if the reset pulse arrives before the completion of the normal cycle of said latching shutdown timer means, said reset pulse being effective to prevent an output being generated by said latching shutdown timer means.

17. In a wheel slip control system having electric solenoids therein which are energized by an electric pulse in response to a logic circuit, and further having at least two point-type speed sensors which generate electrical signals having amplitudes proportional to wheel speeds, the invention of a fault detection system comprising:

a. cyclic timing means;

b. means for actuating said cyclic timing means by initiation of the energization pulse of at least one of said electric solenoids;

c. a crowbar which is triggered into terminating the electric power supply to the wheel slip control circuit by blowing a fuse upon the receipt therein of the signal indicating the completion of the time cycle of said cyclic timing means;

d. means for resetting said cyclic timing means before the completion of its timing cycle, said resetting being operative to avoid shutdown of the wheel slip control system if the reset signal arrives before the completing of the timing cycle;

e. said means for resetting said cyclic timing means being adapted to being triggered into operation by the end of the energization pulse of at least one of said electronic solenoids; and f. means for blocking an initial portion of the energization pulse of at least one of said electric solenoids from being effective to trigger said resetting means for said cyclic timing means, said cyclic timing means being allowed to continue its timing cycle toward completion when said energization pulse is shorter than said blocked initial portion.

18. A wheel slip control for wheel slip control system as recited in claim 17 wherein:

a. said cyclic timing means is comprised of a crowbar delay timer and driver means; and b. said crowbar delay timer and driver means being adapted to being triggered into beginning its timing cycle by the initiation of energization pulse from at least one of said electric solenoids.

19. A wheel slip control for wheel slip control system as recited in claim 18 wherein an OR gate provides the means for combining the energization pulse from either of said electric solenoids in its output, said output thereupon being connected to the input of said crowbar delay timer and driver means.

20. A wheel slip control for wheel slip control as recited in claim 17 wherein said means for blocking contains initial delay means preventing change in output until after the energization pulse endures for longer than said initial delay.

21. A wheel slip control for wheel slip control as recited in claim 20 wherein only the AC component of the trailing edge of said energization pulse is effective to trigger said means for resetting said cyclic timing means.

22. In a wheel slip control system having electric solenoids therein which are energized by an electric pulse in response to a logic circuit, and further having at least two point-type speed sensors which generate electrical signals having amplitudes proportional to wheel speeds, the invention of a fault detection system comprising:
 a. a first cyclic timing means;
 b. means for actuating said first cyclic timing means by initiation of an energization pulse of at least one of said electric solenoids;
 c. means for generating an electric output adapted to latching shutdown of said wheel slip control system upon the completion of the timing cycle of said first cyclic timing means;
 d. means for resetting said first cyclic timing means before the completion of its timing cycle thereby avoiding latching shutdown of the wheel slip control system;
 e. said means for resetting said first cyclic timing means being actuated by the termination of an energization pulse of at least one of said electric solenoids;
 f. a second cyclic timing means having a longer timing cycle than said first cyclic timing means;
 g. means for actuating said second cyclic timing means by initiation of the energization pulse of at least one of said electric solenoids;
 h. a crowbar which is triggered into terminating the electric power supply to the wheel slip control system by blowing a fuse upon the receipt therein of the signal indicating the completion of the timing cycle of said second cyclic timing means;
 i. means for resetting said second cyclic timing means before the end of its timing cycle whereby shutdown of the wheel slip control system is avoided;
 j. said means for resetting said second cyclic timing means being adapted to being triggered into operation by the end of the energization pulse of at least one of said electric solenoids;
 k. said means for resetting said second cyclic timing means being also adapted to being triggered into operation by the end of the timing cycle of said first cyclic timing means;
 l. means for retriggering said second cyclic timing means into a second timing cycle after its initial resetting at the end of the cycle of the first cyclic timing means in response to continued energization of at least one of said electric solenoids past the time when said temporary shutdown output is generated; and
 m. means for allowing said second cyclic timing means to continue its second timing cycle to completion unless reset by the termination of the energization of at least one of said electric solenoids before the end of the second timing cycle of said second cyclic timing means, said completion of the timing cycle of said second cyclic timing means being operative to trigger the operation of said crowbar into terminating the electric power supply to the wheel slip control system by blowing a fuse thereby returning brake control to normal operation.

23. In a wheel slip control system having electric solenoids therein which are energized by an electric pulse in response to a logic circuit, and further having at least two point-type speed sensors which generate electrical signals having amplitudes proportional to wheel speeds, the invention of a fault detection system comprising:
 a. a first cyclic timing means;
 b. means for actuating said first cyclic timing means by initiation of an energization pulse of at least one of said electric solenoids;
 c. means for generating an electric output adapted to temporarily shut down said wheel slip control system upon the completion of the timing cycle of said first cyclic timing means;
 d. a second cyclic timing means having a longer timing cycle than said first cyclic timing means;
 e. a crowbar which is triggered into terminating the electric power supply to the wheel slip control system by blowing a fuse upon the receipt therein of the signal indicating the completion of the timing cycle of said second cyclic timing means;
 f. means for resetting said second cyclic timing means before the end of its timing cycle whereby shutdown of the wheel slip control system is avoided;
 g. said means for resetting said second cyclic timing means being adapted to being triggered into operation by the end of the timing cycle of said first cyclic timing means;
 h. means for detecting that signal cables of said electric solenoids are disconnected;
 i. means for triggering said first and second cyclic timing means into beginning their respective timing cycle upon operation of said detecting means; and
 j. means for preventing triggering of said second cyclic timing means into beginning a second cycle after having been reset by the end of the timing cycle of said first cyclic timing means following initiation by detection of open cables.

24. In a wheel slip control system having electric solenoids therein which are energized by an electric pulse in response to a logic circuit, and further having at least two point-type speed sensors which generate electrical signals having amplitudes proportional to wheel speeds, the invention of a fault detection system comprising:
 a. a first cyclic timing means;
 b. means for triggering said first cyclic timing means into beginning a timing cycle upon receipt therein of a signal indicating the initiation of an energization pulse of at least one of said electric solenoids;
 c. wheel speed comparison means for comparing the apparent speed difference of at least two wheels;
 d. means for triggering said first cyclic timing means into beginning its timing cycle when said apparent speed difference exceeds a predetermined value;
 e. means for generating an electric output adapted to latching shut down of said wheel slip control system upon the completion of the timing cycle of said first cyclic timing means;

f. means for resetting said first cyclic timing means before the completion of its timing cycle thereby avoiding shutdown of the wheel slip control system;
g. said means for resetting said first cyclic timing means being actuated by the termination of an energization pulse of at least one of said electric solenoids;
h. a second cyclic timing means having a longer timing cycle than said first cyclic timimg means;
i. means for actuating said second cyclic timing means by initiation of the energization pulse at least one of said electric solenoids;
j. a crowbar which is triggered into terminating the electric power supply to the wheel slip control system by blowing a fuse upon the receipt therein of the signal indicating the completion of the timing cycle of said second cyclic timing means;
k. means for resetting said second cyclic timing means before the end of its timing cycle whereby shutdown of the wheel slip control system is avoided;
l. said means for resetting said second cyclic timing means being adapted to being triggered into operation by the end of the energization pulse of at least one of said electric solenoids;
m. means for blocking an initial portion of the energization pulse of at least one of said electric solenoids from being effective to trigger said means for resetting said second cyclic timing means, said second cyclic timing means being allowed to continue its timing cycle toward completion when said energization pulse is shorter than said blocked initial portion;
n. means for detecting that signal cables of said electric solenoids are disconnected;
o. means for triggering said first and second cyclic timing means into beginning their respective timing cycles upon operation of said means for detecting;
p. means for preventing triggering of said second cyclic timing means into beginning a second cycle after having been reset by the end of the timing cycle of the said first cyclic timing means following initiation by detection of open cables;
q. means for retriggering said second cyclic timing means into a second timing cycle after its initial resetting at the end of the cycle of said first cyclic timing means in response to continued energization of at least one of said electric solenoids past the time when said temporary shutdown output is generated at the end of the timing cycle of said first cyclic timing means; and
r. means for allowing said second cyclic timing means to continue its said second timing cycle to completion unless reset by the termination of the energization of at least one of the electric solenoids before the end of the second timing cycle of said second cyclic timing means.

* * * * *

UNITED STATES PATENT OFFICE
CERTIFICATE OF CORRECTION

Patent No. 4,013,324            Dated March 22, 1977

Inventor(s) Donald S. Quon

It is certified that error appears in the above-identified patent and that said Letters Patent are hereby corrected as shown below:

Col. 15, Line 41 (Claim 14): "claim 12" should read
--claim 13--

Col. 16, Line 11 (Claim 16): "claim 12" should read
--claim 13--

Signed and Sealed this fifth Day of July 1977

[SEAL]

Attest:

RUTH C. MASON
Attesting Officer

C. MARSHALL DANN
Commissioner of Patents and Trademarks